United States Patent [19]

Doncker et al.

[11] Patent Number: 4,852,533

[45] Date of Patent: Aug. 1, 1989

[54] MOUNTING ARRANGEMENT FOR VEHICLE ENGINE AND THE LIKE

[75] Inventors: Francis Doncker, Neuhausen; Rolf Helber, Schorndorf; Gerhard Welzel, Seeshaupt; Richard Bung, Ludwigshafen, all of Fed. Rep. of Germany

[73] Assignee: Daimler-Benz Aktiengesellschaft, Stuttgart, Fed. Rep. of Germany

[21] Appl. No.: 121,340

[22] Filed: Nov. 16, 1987

[30] Foreign Application Priority Data

Nov. 14, 1986 [DE] Fed. Rep. of Germany ....... 3639091

[51] Int. Cl.4 .............................................. F02B 75/06
[52] U.S. Cl. ............................... 123/192 R; 123/198 E
[58] Field of Search ........... 123/192 R, 192 B, 198 E; 248/550; 267/35; 280/707, 714; 180/299, 300, 312, 902, 291

[56] References Cited

U.S. PATENT DOCUMENTS 4,531,484  7/1985  Kimura et al. .................. 123/192 R
4,537,275  8/1985  Kimura et al. .................. 123/192 R
4,671,227  6/1987  Hollarwager et al. ......... 123/192 R Primary Examiner—Raymond A. Nelli
Attorney, Agent, or Firm—Barnes & Thornburg

[57] ABSTRACT

In the case of a shearing element that can be used as an engine mounting in a motor vehicle, an elastic damping body that is developed in the way of a rubber—metal mounting and a shearing unit are provided in a mechanical parallel connection for supporting the engine at the body. It is their purpose to avoid, in the natural-vibration range of the mounting—mass system, an excessive increase of the amplitudes in the case of a resonance.

18 Claims, 7 Drawing Sheets

MOUNTING ARRANGEMENT FOR VEHICLE ENGINE AND THE LIKE

BACKGROUND AND SUMMARY OF THE INVENTION

The invention relates to a mounting arrangement with a shearing element for the dynamic support of forces between two parts of an assembly that can carry out vibration-type relative movements with respect to one another. The mounting arrangement of the invention is especially useful in supporting vehicle engines at a vehicle chassis.

A shearing element of the general type contemplated is disclosed in German Published Unexamined Application (DE-OS) No. 31 52 751. It is intended specifically for the vibration-insulating mounting of an engine at the body or at the chassis of a motor vehicle and comprises—in a mechanical parallel connection—a rubber-elastic buffer that provides an elastic coupling between the engine and the body, as well as a shearing unit that has the purpose of avoiding a resonance rise of the amplitudes of the vibrations that can occur in the buffer-mass system. Within a block that is firmly connected with the body, the shearing unit comprises a receiving space that is filled with a dilatant fluid, a plunger that is connected with the engine projecting into this receiving space and in a special development delimiting, in connection with the receiving space, an annular duct or gap in which the fluid is subjected to periodic flow movements that are forced by the immersion of the plunger. The fact is utilized that, in the case of an exceeding of critical values of the shearing $\gamma$ as well as of the shearing speed $\dot{\gamma}$, a dilatant fluid experiences a drastic increase of viscosity that at the same time results in a jump of the rigidity of the mounting as a whole. The shearing unit is dimensioned in such a way that this jump in rigidity takes place approximately in the range of the natural-vibration frequency of the damping body/mass system, when it is considered separately. In addition, the known mounting is dimensioned in such a way that for vibration amplitudes that are smaller than about 60 $\mu$m, the critical value of the shearing can no longer be exceeded and therefore, even if the shearing speed in the fluid were to be above the respective critical value $\dot{\gamma}_s$, which may occur in the case of acoustic vibrations of a higher frequency that, however, can be energized only with relatively small amplitudes, the jump in rigidity cannot occur and thus the vibration insulation characteristics toward higher frequencies are again determined only by the damping body which results in a favorable behavior of the mounting in the sense of a suppression of noise.

However, the known shearing unit has at least the following disadvantages:

The volume within which the dilatant fluid is subjected to the minimum shearing with an overcritical value of the shearing speed, is limited to an annular-gap-shaped space and therefore is relatively small. For a dimensioning of the shearing that is suitable for being able to absorb the dynamic loads that occur in practice and that range from 300 to 400 N, relatively large physical dimensioning of the plunger and of the block containing the receiving space are required that result in dimensions that are disadvantageous for an installation into a vehicle. Since the volume of fluid that is displaced by the plunger in the time unit is clearly larger than the speed of the relative movement of the plunger, that is multiplied with the area of the annular gap through which the dilatant fluid is forced, in relation to the block of the shearing unit, a multiplication of the flow speed of the dilatant fluid occurs in the shearing gap. This, on the one hand, has the result that the shearing unit responds very rapidly in the sense of an increase of its rigidity, i.e., it is sufficient, when the shearing has exceeded its minimum value $\gamma_{min}$, to let even a slight change of the vibration frequency around the mounting "suddenly" harden, which can have the effect of an annoying impact to the body. In addition, the mentioned multiplication of the flow speed, even when the critical values of the shearing and/or the shearing speed in the dilatant fluid—in the range of acoustic vibrations of higher frequencies—are not longer exceeded, has the result that, because of the inertia of the fluid, an increasing dynamic rigidity of the shearing unit and thus of the mounting including of its damping body occurs, and its damping characteristics in the direction of higher frequencies of the excitable vibrations, deteriorate again.

In order to at least partially avoid the above-mentioned disadvantages of the known shearing element that arise from a multiplication of the flow speed of the dilatant fluid in a relatively narrow shearing gap that receives only a small volume of the dilatant fluid, it may be considered to modify a shearing element of the initially mentioned type to the extent that, as is known per se from West German (DE) No. 30 10 520 Al and East German (DD) 227 763 Al in connection with vibration damping arrangements in which, as the damping material, a highly viscous damping medium is used, tube-shaped immersion bodies are provided that also carry out the vibrations of the masses that can be moved with respect to one another, and that, with respect to an axis marking the vibrating direction, are arranged coaxially in such a way that the immersion bodies that go along in the vibrations of one mass dip into annular gaps that are delimited radially by the tube-shaped immersion bodies that go along in the vibrations of the other mass, these annular gaps then having to be filled with the dilatant fluid.

However, a shearing element of this type would then have the disadvantage that, in the case of relative movements of the masses that can vibrate with respect to one another that take place at a right angle with respect to the axis or direction marking the "main vibrating direction", within the receiving space that is filled with the dilatant fluid, at least in areas, drastic changes of the shearing gap widths would occur and thus of the shearing speeds within the dilatant fluid, with the disadvantageous result that, also in the case of a shearing element that is modified in this way, the vibrating characteristics would change in an uncontrolled way. Also, at least in areas, high shearing speeds would occur that are multiplied by the narrowing of the shearing gap, with the above-mentioned disadvantageous consequences for the dynamic behavior of a shearing element of this type. In order to reliably exclude damage to the immersion bodies, it would have to be ensured by means of guiding and/or stop elements that the masses that can vibrate with respect to one another can carry out vibrating movement only in such a way that a change of the shearing gap widths is largely excluded. The application possibilities of a shearing element of this type would therefore be limited to the few cases in which a vibration insulation is required only for one vibrating direction. It would therefore not be suitable for use as a vibration-insulating shearing element, the vibration-insulating characteristics must not be impaired when an overlapping of vibrations is be expected in all coordinate directions, as, for example, in the case of an engine mounting of a motor vehicle.

It is therefore an objective of the invention to provide a shearing element of the initially mentioned type that, in the case of a design for a predetermined dynamic maximum load, results in a softer rise of the viscosity of the dilatant fluid in the natural vibration range of the mounting-mass system when critical values of the shearing and of the shearing speed are exceeded, but in the direction of higher frequencies, develops less dynamic rigidity, that without any impairment of its vibration insulating characteristics, can also still be used when it is subjected to an overlapping of vibrating movements in different coordinate directions, and in this case can still be implemented as a simple and space-saving construction.

According to the invention, this objective is achieved by constructing the shear element as respective sets of plate shaped lamellae immersed in viscous fluid and connected to the engine and body side respectively. Preferably the plates are mounted pivotally and configured so they can move relatively to one another in multiple space coordinate directions.

By means of the accordingly provided development of the immersion bodies that can be moved with respect to one another within the dilatant fluid, as "lamellar combs" that, with their swivelling lamellae, engage between two lamellae respectively of the lamellar comb that can be moved in opposite direction, a highly effective utilization is achieved of the space that is available for generating a shearing in the dilatant fluid, in such a way that, when the increase of viscosity occurs in the dilatant fluid, a massive "fixed" column occurs between the masses that vibrate against one another that permits the absorption of high dynamic loads. Since the shearing and the shearing speed, in the case of the shearing element according to the invention in each case corresponds to the amplitudes of the relative movements of the masses that are supported with respect to one another and their time-related change, these parameters change correspondingly "slowly" so that the viscosity rise of the dilatant fluid occurs within an expanded variation range of the change of the shearing and of its speed, and the connected increase of the rigidity of the shearing element does not occur in steps but softly in a "ramp shape". Since within the space that is filled by the dilatant fluid, compensating movements of the dilatant fluid occur as a result of the speed of the relative movements of the masses that vibrate against one another, and this taking place with a very small volume of the lamellae, the dynamic stiffening of the shearing element according to the invention that is caused by the inertia of the fluid is also advantageously low.

As a result of the pivotable mounting of the shearing lamellae, these shearing lamellae, also when the masses that can vibrate with respect to one another carry out relative movements in one vibration form that correspond to an overlapping of vibrations in all—three—coordinate directions, can carry out compensating movements that, within the vibrating amplitudes occurring in practice, lead to no more than an insignificant change of the shearing gap widths which does not impair the vibration insulating characteristics of the shearing element according to the invention.

In especially preferred embodiments the lamella plates at the engine side and body side are pivotably supported about respective pivot axes that are parallel with one another, providing the desired movement direction Possibilities. This provides for a constructively uncomplicated development of the shearing unit that is suitable for relative movements in all coordinate directions of the masses that can vibrate with respect to one another.

In especially preferred embodiments of the invention the receiving space for the dilatant fluid and the shearing lamellae plates is bounded in a radial direction with respect to a central longitudinal axis by flexible bellows. A head plate is connected for movement with one mass (e.g. an engine) and a base plate is connected for movement with the other mass (e.g., a vehicle body support part). The bellows and the head and base plate form a fluid tight receiving space for the dilatant fluid and the shearing lamellae plates.

In certain preferred embodiments the bellows is surrounded by a cup-shaped upwardly open part that is fixed to the base plate of the shearing element. An elastic damping body connected to the engine is supported at the top of the outer rim of the cup-shaped part, the head plate of the shearing unit being fixed at a rigid mounting piece that penetrates centrally through the damping body and is firmly connected with the engine and the damping body. This arrangement of the shearing unit and of the damping body of a shearing element is particularly suited for an integrated method of construction with small outer dimensions.

In especially preferred embodiments the lamellae plates are provided with rod shaped edges which form a pivot connection at the respective head and base plate. Such a contructionally simple and operationally reliable arrangement is particularly suited for a design of the shearing element for moderate dynamic loads. Especially preferred are one piece stamped parts, preferably aluminum, with a plate thickness of 1 mm and a rod shaped round rod edge with a diameter of 2 mm.

Certain preferred embodiments provide a shearing element with swivelling shearing lamellae connected via t-grooves in a head plate movable with the engine and a base plate movable with an engine. Anchoring pieces with roll off edges are provided to permit pivoting. Such a design is especially suited for higher dynamic loads. Advantageous ways are provided for implementing the shearing lamellae and their arrangement with respect to one another that permit a particularly effective utilization of the volume range within which the dilatant fluid can be subjected to the required shearing.

By means of an equidistant arrangement of the shearing lamellae within the receiving space containing the dilatant fluid, in which case, an advantageous range of possible values of the lamella distances is indicated and it is achieved that the whole volume range within which the dilatant fluid can be subjected to the shearing, contributes uniformly to the increase of rigidity of the shearing element in the case of a resonance.

Spacers that are provided for maintaining the desired lamella distances can be implemented in a simple way by means of dome shaped arched out areas in the lamella plates.

In especially preferred arrangements the shearing element is suitable for use in an engine mount for a motor vehicle with the swivel axes of the lamellae extending at right angle to the vehicle longitudinal direction. This minimizes bothersome noise development expected which is mainly caused by the vertical relative movements of the engine and the body, and possibly also by tilting-swinging movements of the engine around the longitudinal axis of the vehicle.

In a special development of the invention, two shearing lamellae respectively of the shearing lamellae on the side of the base plate are, in a U-shape, combined to a double shearing lamella into which the shearing lamallae on the side of the head plate immerse that are held at the distance of the width of a shearing gap by means of spacers. As a result, although the utilizable shearing volume is reduced slightly, the maintaining is ensured of shearing gap widths that are Predetermined in a defined way and thus a defined response behavior of the shearing element is also ensured.

The shearing element units constructed according to the invention, in varied ways, can be adapted to the respective occurring requirements, by means of the composition of the used dilatant fluid as well as by means of the number of the shearing lamellae and their design and arrangement with respect to one another, whereby the amplitude and the frequency of the vibrations can be predetermined, at which the shearing element responds in the sense of an increase of rigidity. If it is important that the shearing element, in the frequency scale of the possible vibrations within a frequency interval that is as narrow as possible, develops its full rigidity, an equidistant arrangement of the shearing lamellae is most advantageous. If, on the other hand, it is desired that the shearing element develops its stiffness within a wider frequency interval "gradually", this type of spreading of the response range, in a simple way can be achieved by means of an arrangement that deviates from an equidistant arrangement of the shearing lamellae. A—contemplated—design of a shearing element according to the invention that is advantageous for use as an engine mount at a motor vehicle may, for example, consist of the fact that this shearing element experiences its jump in rigidity, seen in the frequency scale of the possible vibrations, between the so-called cancelling frequency and the resonance frequency of the spring-mass system that is formed by the mass $m_1$ of the engine and the mass $m_2$ of the body and the damping body or bodies coupling these two masses with one another. The shearing element then, at the cancelling frequency $\nu_T$, with which that form of vibration is connected at which the engine alone carries out vibratory movements with respect to the body that is stationary—seen in vibratory direction—will still be sufficiently flexible in order to accommodate this moving condition of minimal sound transmission to the body, at the resonance frequency $\nu_R$ that is by the factor $\sqrt{(m_1+m_2/m_2}$ larger and that corresponds to the natural vibration form, at which the engine and the body with approximately the same amplitudes experience phase-opposed deviations, but in its condition of maximum rigidity that is most advantageous for the suppression of the resonance rise of the vibration amplitudes.

Other objects, advantages and novel features of the present invention will become apparent from the following detailed description of the invention when considered in conjunction with the accompanying drawings.

DETAILED DESCRIPTION OF THE DRAWINGS

Figure 1:
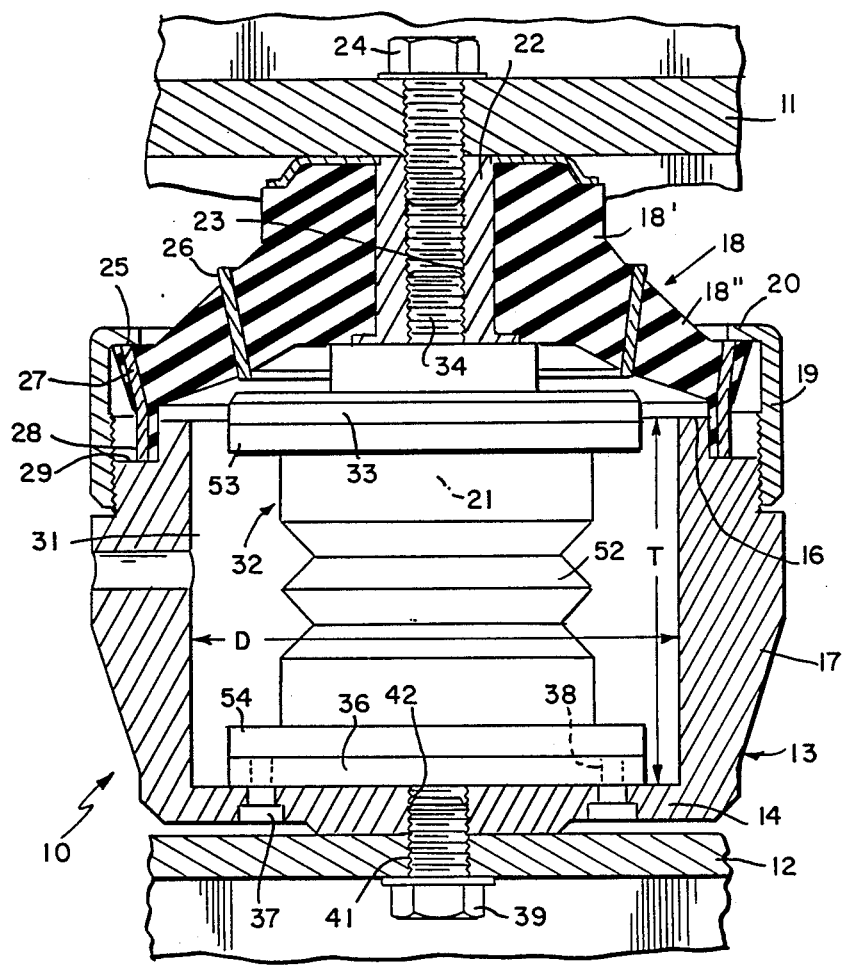
FIG. 1 is a schematic, part sectional view of an engine mount, having a shearing unit that is arranged in a mechanical parallel connection with an elastic damping body between the engine and the body of the vehicle, constructed in accordance with a preferred embodiment of the invention.
Figure 2:
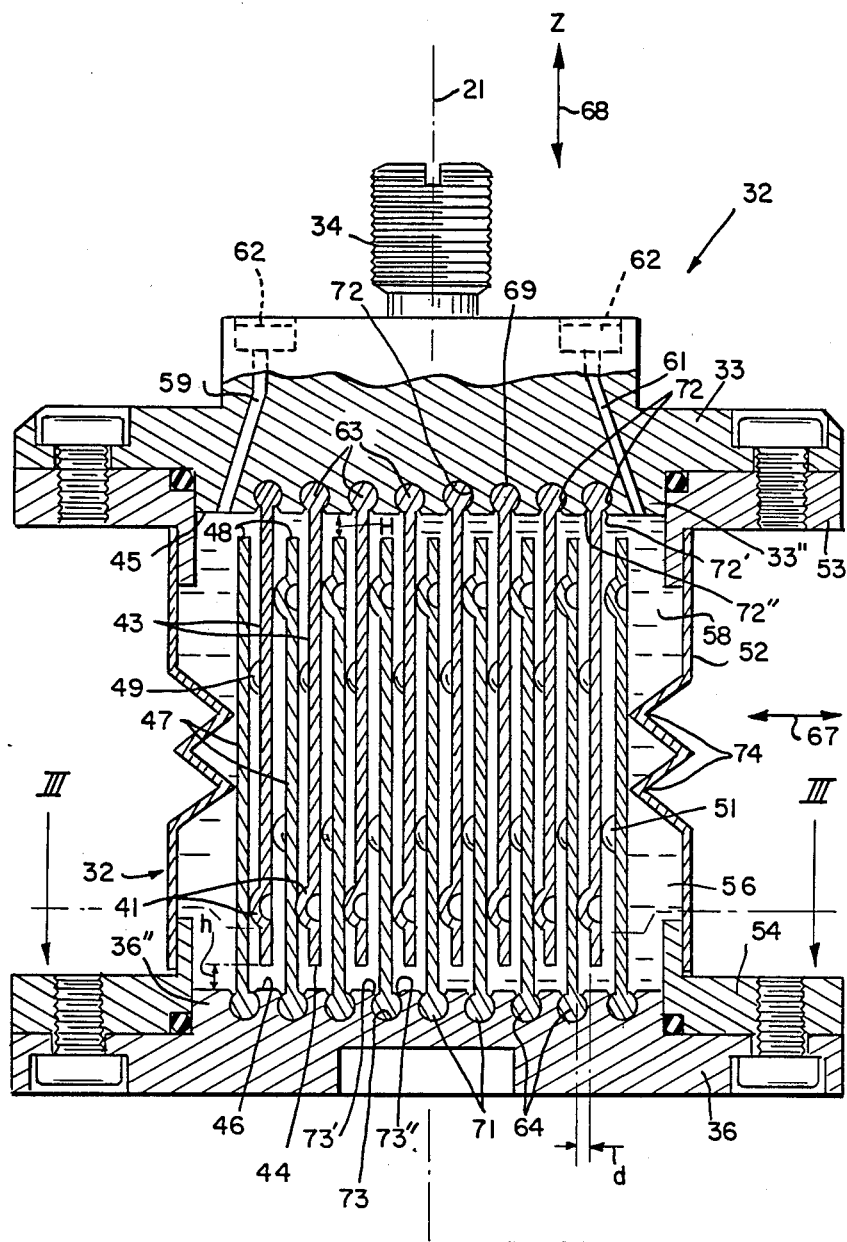
FIG. 2 is a sectional view of the shearing unit of the engine mount according to FIG. 1, taken along a vertical central plane of this shearing unit that extends in parallel to the longitudinal center plane of the vehicle.

The shearing element 10 according to the invention that is shown in FIGS. 1 and 2—explicit reference being made to the details of these figures—, for the vibration-insulating—transmission of forces between two parts 11 and 12 of the assembly that can carry out relative vibration movements with respect to one another, without limiting its general aspects, i.e., only for the purpose of an explanation, will be assumed to be the engine mount of a motor vehicle, the body or the chassis of which will be represented by the lower, rigid part 12, and the engine of which will be represented by the upper rigid body 11 of FIG. 1. The engine mount 10 comprises a circular-cylindrical cup-shaped part 13 that is connected firmly with the body 12 of the vehicle and is open toward the top and the clear depth T of which measured between the bottom 14 and the upper ring-shaped front face 16 of its shell 17, in the case of the shown, special embodiment, amounts to 6 cm and its clear diameter D amounts to 8 cm. A damping body 18 is fitted onto the cup-shaped part 13 and is held at the cup-shaped part 13 by means of a screw cap 19. This damping body 18 and the cup-shaped part 13 of the engine mount 10 are developed in a rotationally symmetrical way with respect to the central axis 21 of the shearing element 10.

The damping body 18 that, on the whole, has a truncated-cone-shaped or thick-walled conical-shell-shaped design, with respect to its shape, corresponds to a buffer that is used conventionally for the mounting of the engine at the underframe or at the body of a motor vehicle. Damping body 18 is developed as a so-called rubber—metal mounting by means of which an elastic vibration insulation of the engine 11 with respect to the body of the vehicle that is caused by a damping effect can be achieved at least in the range of higher-frequency vibrations, i.e., vibrations that occur clearly above the resonance frequency of the mounting-mass system.

Centrally vulcanized into the damping body 18 is a tube-shaped sleeve 22 having an internal thread 23 that is used for fastening the shearing element 10 on the side of the engine by means of a fastening screw 24 that is applied in the internal thread 23.

In the shown special embodiment, the damping body 18 consists essentially of two rubber-elastic parts 18′ and 18″ that are offset with respect to one another by means of a thin-walled conical metal ring 26 that slightly tapers downward in the representation of FIG. 1, and are vulcanized onto this metal ring 26. In this case, the radially inner damping body part 18′ is developed to be essentially thick-walled cylindrical, while the radially outer damping body part 18″ has essentially the shape of a thick-walled conical shell the thickness of which is reduced slightly toward the outside.

The outer conically ring-shaped part 18″ of the damping body 18 is enclosed by an also thin-walled enclosing ring 27 made of metal that is ring-shaped in sections, is circular-cylindrical in downward direction and that with its lower ring face surface 28, supports itself at an outer ring fold surface 29 of the shell 17 of the cup-shaped part 13 that is located several millimeters deeper than the ring-shaped front face 16 of the cup shell 17. The outer enclosing ring 27 of the damping body 18 is also vulcanized onto the outer damping body part 18″. The cap screw 19 supports itself with its retaining ring 20 at the upper ring face surface 25 of the outer enclosing ring 17 of the damping body 18.

The damping body 18 is dimensioned in such a way that, under the load of the engine that is statically supported at the body 12, it has the essentially truncated-cone-shell-shaped design that is shown in FIG. 1. The material of which the elastically flexible parts 18′ and 18″ of the damping body 18 consist may, for example, be natural caoutchouc, silicone caoutchouc, polybutadiene or another elastomer that, with respect to its elastic characteristics, is equivalent to the above-mentioned materials.

A shearing unit 32 is disposed within the essentially cylindrical interior space of the engine mount 10 that is delimited in downward and radial direction by the cup-shaped part 13 and is delimited in upward direction by the damping body 18. Shearing unit 32 is connected firmly with the bottom 14 of the cup-shaped part 13 and therefore is also connected firmly on one side with the body 12 of the vehicle, and on the other side, is connected firmly with the tube-shaped central sleeve 22 of the damping body 18 and thus is also connected firmly with the engine 11 of the vehicle. The shearing unit 32 is therefore arranged in mechanical parallel connection with the damping body 18.

The shearing unit 32 that is also explained in greater detail by the details of FIG. 2, comprises a headplate 33 of a circular-disk-shaped basic shape made of steel or aluminum, a threaded pin 34 being formed in one piece with this head plate 33. By means of threaded pin 34, the head plate 33 and with it, the shearing unit 32 as a whole, can be secured at the engine 11 by means of a screwing into the internal thread 23 of the tube-shaped sleeve 22 of the damping body 18.

The shearing unit 32 also comprises a base plate 36—that with respect to its basic shape is also a circular disk. Base plate 36 can be secured at the cup-shaped housing part 13 of the shearing element 10 by means of fastening screws 37 penetrating the bottom 14 of the cup-shaped part 13 that, along the circumference of the base plate 36, engage in threaded bores of the base plate that are arranged at regular angular distances. The cup-shaped housing part 13 can be secured at the body 12 by means of a fastening screw 39 that, penetrating through a bore 41 of the body 12, can be screwed into a central threaded bore 42 of the bottom 14 of the cup-shaped part 13.

At the head plate 33 of the shearing unit 32, rectangular flat-plate-shaped shearing lamellae 43 are held that are arranged in parallel and, in the representation of FIG. 2, point downward. The lower transverse edges 44 of these shearing lamellae 43—in the basic position of the engine mount 10 when under the static load of the engine 11—extend at a clear distance h from the flat interior surface 46 of the base plate 36. This distance h is somewhat larger than the maximum amplitudes of the vibrating movements which the head plate 13 and the base plate 36 can carry out with respect to one another under the dynamic stressing of the mount 10, i.e. in the driving operation of the vehicle, seen in the direction of the central longitudinal axis of the shearing unit 32.

In a similar manner, correspondingly formed parallel shearing lamellae 47 are held at the base plate 36 that point upward, seen in the representation of FIG. 2. Also the upper transverse edges 48 of these shearing lamellae 47 extend—again seen in the basic position of the mount 10—at the clear distance H from the flat interior surface 45 of the head plate 33. This clear distance H has typical values of between 4 and 10 mm and preferably a value of 5 mm. The shearing lamellae 43 and 47, seen in the direction of the central longitudinal axis 21, have a typical length of 4 to 5 cm and a width of 3 cm that is measured at a right angle to it. Typical values of the thickness of the shearing lamellae 43 and 47, according to whether they consist of aluminum or steel, are one millimeter (1.0 mm) or 0.5 mm.

The shearing lamellae 43 originating from the head plate 33 and the shearing lamellae 47 originating from the base plate 36 are arranged in such a way that each of the lamellae 43 originating from the head plate 33 engages between two respective lamellae 47 projecting upward from the base plate 36 resulting, according to the sectional representation of FIG. 2, in a structure of the overall bundle of lamellae 43, 47 that corresponds to two "combs" that are mated in one another. The arrangement of the shearing lamellae 43 and 47 that originate from the head plate 33 and that originate from the base plate 36 is such that the clear distances d between two respective adjacent shearing lamellae 43 and 47 are the same in each case, in which case these distances d may have values between 0.5 and 2 mm and preferably may have a value around one millimeter. The shearing lamellae 43 and 47, on one side and in each case on the same side, are provided with small dome-shaped arched-out parts 49 and 51 that are used as spacers for the provided spacing value d and that, in each case, support themselves at a flat surface section of the adjacent lamella 47 or 43 and can slide along it when the mount 10 is subjected to vibrations. These arched-out parts 49 and 51 of the lamellae 43 and 47 are arranged so that they are offset with respect to one another in such a way that their convexly arched areas cannot engage in the concavely arched areas of the arched-out parts of the respective adjacent lamella 43 or 47.

The space 50 that is taken up by the shearing lamellae 43 and 47 and that as a whole has the shape of a rectangular parallelepiped is enclosed by a flexible fluid-tight bellows 52. Bellows 52 is fastened at the head plate 33 by upper fastening flange 53 and at the base plate 36 by lower fastening flange 54. Bellows 52 is sealed off with respect to the flanges so that, by means of the head plate 33, the base plate 36 and the bellows 52 extending between them, a receiving space 56 containing the shearing lamellae 43 and 47 is closed off to the outside in a fluid-tight way.

The bellows 52 is developed in such a way that it offers no significant dynamic resistance to the vibrating movements of the engine 11 and of the body 12 of the vehicle with respect to one another, and develops no restoring forces, i.e., no more than negligible restoring forces in the axial direction with respect to the damping body 18. In a special development, the bellows 52 consists of a fluid-proof, impregnated, fine-meshed textile fabric that permits a thin-walled development of the bellows 52. The bellows 52 may also be developed as a rubber bellows, possibly also as a thin-walled bronze or steel bellows.

Figure 3:
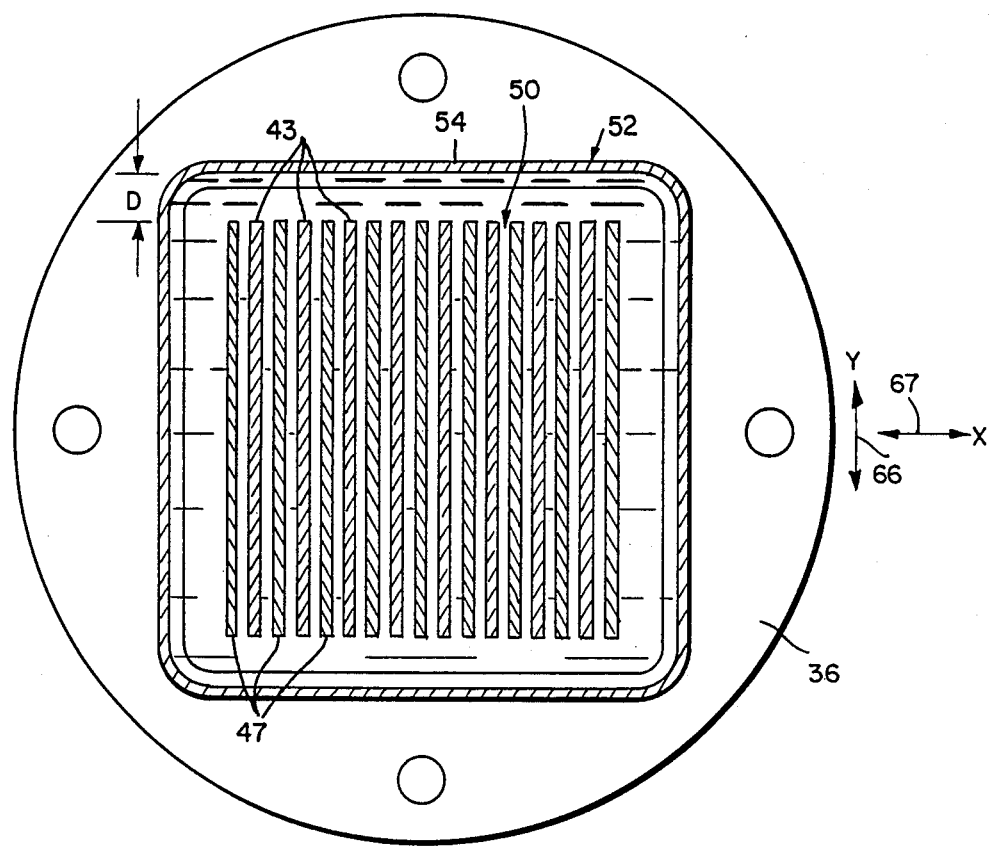
FIG. 3 is a sectional view of the shearing unit according to FIG. 2 taken along the plane III—III of FIG. 2.

The rectangular base area 57 of the receiving space enclosed by the bellows 52, as best shown in the representation of FIG. 3, is somewhat larger than the base area of the space 50 taken up by the bundle of lamellae 43, 47 between the head plate 33 and the base plate 36.

The receiving space 56 is filled with a dilatant fluid 58 that, in the case of the shown embodiment, fills this receiving space 56 out completely to the extent required for operation of the shearing element. A respective filling duct 59 and a venting duct 61 that are provided at the head plate 33 of the shearing unit 32 can each be closed tightly by means of a counter sunk threaded screw stopper 62 and 62'.

The dilatant fluid at the engine mount 10 is a copolymer dispersion that can be produced by the emulsion copolymerization of $\gamma$, $\beta$-mono-olefinically unsaturated mono- and/or dicarboxylic acids with other mono-olefinically unsaturated and, if necessary, small amounts of multiple-olefinically unsaturated monomers in the presence of conventional emulsifying and dispersing agents as well as of polymerization initiators and has a copolymeride content of between 35 and 55%. The production of such —dilatant—copolymeride dispersions that can be obtained within a wide concentration range of the copolymeride content with a low dispersion of the particle sizes, is described in detail, for example, in German Published Unexamined Patent Application DE-OS No. 30 25 562 to which reference is made in this respect. The copolymeride dispersions of this substance class distinguish themselves by a good long-term constancy of their chemical and physical characteristics. They can be obtained with different values of the initial viscosity as well as of the critical shearing speed $\dot{\gamma}$, in which case the variation range of the critical shearing speed $\dot{\gamma}$ may be between $1 s^{-1}$ and $10^4 s^{-1}$, and the minimum value $\gamma_{min}$ of the shearing must be reached so that the dilatant fluid experiences its increase in viscosity—that is characteristic of its dilatant action—is around 0.5.

Naturally dilatant fluids may also be used in the engine mount that belong to other substance classes than the above-mentioned one, if their rheological characteristics are similar or equal to those of the above-mentioned copolymeride dispersions.

In the case of the special embodiment of the shearing unit 32 of the engine mount 10 that is shown in FIG. 2, the shearing lamellae 43 and 47 are pivotably disposed at the head plate 33 and the base plate 36. The pivotal axes 63 of the shearing lamellae 43 held at the head plate 33, and the pivotal axes 64 of the shearing lamellae 47 held at the base plate 36, in the representation of FIG. 2, extend vertically with respect to the plane of the drawing, and in FIG. 3, extend in the—horizontal—direction that is represented by the double arrow 66 and is marked with a Y, in which the head plate 33 and the base plate 36 and the shearing lamellae 43 and 47 that are held at them can carry out—also horizontal—relative movements with respect to one another.

The X-direction that is at a right angle to the Y-direction in which the head plate 33 and the base plate 36 of the shearing unit 32—as a result of the pivotability of the shearing lamellae 43 and 47—can also carry out horizontal—relative movements with respect to one another, in FIGS. 2 and 3, is represented by the double arrow that in each case has the number 67. The Z-direction that is perpendicular with respect to the Y-direction 66 and also with respect to the X-direction 67 and in which the shearing lamellae 43 that are flexibly connected with the head plate 33 and the shearing lamellae 47 that are connected with the base plate 36 can carry out vertical relative movements with respect to one another—that take place essentially in parallel to the central longitudinal axis 21 of the shearing unit 32—is represented in FIG. 2 by the double arrow 68.

For the pivotal mounting of the head plate 33 and of the base plate 36, the shearing lamellae 43 and 47 have upper and lower sectional edge pieces 69 and 71 that are developed in the shape of round rods and that can be inserted into grooves 72 and 73 of the head plate 33 and of the base plate 36 that are open in downward or upward direction. These grooves 72 and 73 extend around the rod-shaped sectional edge pieces 69 and 71—with a small play that is required for purposes of mobility—so far that the shearing lamellae 43 and 47 cannot be pulled out of the respective grooves 72 and 73 in the Z-direction.

In the case of the illustrated embodiment, the diameter $2r$ of the sectional edge pieces 69 and 71 is two millimeters, $r$ being the radius of the sectional edge pieces. The shearing lamellae have a thickness of 1 mm. The grooves 72 and 73 reach around the sectional edge pieces 69 and 71 over an angular area of 285°. The longitudinal opening edges 72' and 73' extending in parallel to the pivotal axes 63 and 64 of the shearing lamellae 43 and 47 are connected in each case via a segment 72" and 73" that is sloped by 60° with respect to the longitudinal direction 21 to the—horizontal—interior surfaces 45 and 46 of the head plate 33 and of the base plate 36.

Grooves 69 and 71 are each arranged in a reinforced area 33" and 36" respectively of the head plate 33 and the base plate 36 that is enclosed by the respective fastening flange 53 and 54 of the bellows 52. The shearing lamellae, seen in the direction of their pivotal axes 63 and 64, apart from a small play, are held immovably at the head plate 33 and the base plate 36 in grooves 69 and 71.

With respect to the initial position of the shearing unit 32 shown in FIG. 2, the shearing lamellae 43 and 47, in each case, can be swivelled by about 15° clockwise and counterclockwise.

The arched-out areas 41 and 51 are kept so much lower than the distance d of the shearing lamellae 43 and 47 that is characteristic of the initial position that they can still be swivelled back and forth by the mentioned 15°.

In the case of the shown embodiment according to FIG. 2, eight shearing lamellae 43 that are disposed at the head plate 33, and nine shearing lamellae 47 that are disposed at the base plate 36 are provided in a symmetrical arrangement with respect to the transverse center plane of the shearing unit 32 that contains the central longitudinal axis 21. Thus, a total of 16 flat spaces are obtained that are each delimited by a pair of shearing lamellae 43 and 47 and within which the dilatant fluid 58 experiences a shearing $\gamma$ when the head plate 33 and the base plate 36 and with it the shearing lamellae 43 and 47 move relative to one another in Z-direction 68 and/or in Y-direction 66.

The elastically flexible bellows 52 has folds 74 that are directed radially toward the inside and that push the two extreme shearing lamellae 47 that are disposed at the base plate 36 with moderate force so that they rest against the remaining bundle of shearing lamellae 43, 47.

In order to explain the operating characteristics of the engine mount 10, it will be assumed that the engine—a conventional in-line engine—is installed into the vehicle in longitudinal direction of the vehicle and, by means of two engine mountings 10 that are arranged symmetrically with respect to the longitudinal center plane of the engine or of the vehicle, is held and flexibly supported at the body or a cross member of an underframe of the vehicle. The engine, the body and the two engine mountings 10 will then form a spring-coupled 2-mass system, the "coupling spring" of which are the two damping bodies 18 of the engine mounting 10. In this spring—mass system, relative movements between the engine 11 and the body 12 may occur in the three coordinate directions—X-direction 67, Y-direction 66 and Z-direction 68, and thus, if in these directions, periodic forces are active between the engine 11 and the body 12, vibrations can also be excited in a resonant way. "Resonant" means in this case that the excitation takes place with the natural frequency $v_E$ of the spring—mass system 11, 18, 12 which, with the prerequisite of an ideally elastic behavior of the damping bodies 18, is a result of the relation $$v_E = \tfrac{1}{2}\sqrt{F/M_r} \qquad (1)$$

F being the effective overall direction—force constant of the damping bodies 18 of the mounting 10, and $M_r$ being the reduced mass of the masses 11 and 12 that can vibrate with respect to one another, this relation, in turn, being the result of the relation $$Mn = \frac{M_1 \cdot M_2}{M_1 + M_2} \qquad (2)$$

$M_1$ being the mass of the engine 11, and $M_2$ being the mass of the body 12 of the vehicle. Typical values of the natural-vibration frequencies of the mounting—mass system for that type of natural vibrations, in which the engine 11 and the body 12 vibrate in Z-direction 68 with respect to one another, i.e., in the case of that type of vibration that can be excited particularly easily and correspondingly frequently by the so-called "road excitation" that is triggered by driving over uneven parts of the road, are between 5 and 15 cycles per second (Hz).

If the engine mountings 10 consist in each case of only the elastic damping body, in the case of a resonant vibration excitation of the mounting-mass system 11, 10, 12—because of the known resonance rise—very high vibration amplitudes would occur, and a large part of the vibration energy would be transmitted to the body of the vehicle, resulting in vibrations of the body that would reduce the driving comfort considerably.

This type of resonance rise of the vibration amplitudes in the natural vibration range is avoided in the case of the engine mounting 10 by means of its shearing unit 32 which, for this purpose, is designed in such a way that even at a frequency that is lower than the resonance frequency resulting from relation (1), the—drastic—rise in viscosity occurs of the dilatant fluid 58 contained in the fluid receiving space 56 of the shearing unit that results from an exceeding of the minimum shearing $\gamma_{min}$ and of the critical value $\gamma_S$, causing the mounting 10 to become "hard". The mounting 10 then provides an almost rigid coupling of the engine 11 to the body 12 of the vehicle, whereby it is achieved that in the range of the natural vibration of the mounting-mass system 11, 10, 12, any significant resonance rise can no longer occur. When the mounting 10 carries out vibrating movements—in Z-direction 68—, the shearing of the dilatant fluid 58 in the layers between two adjacent shearing lamellae 43 and 47 can be described by the following relation:

$$\gamma = A/d \cdot e^{i\omega T} \qquad (3)$$

wherein A is the amplitude of the vibrating movement, d is the distance between the two shearing lamellae 43 and 47 and $\epsilon$ is the radian frequency of the vibration ($\omega = 2n\gamma$ — vibration frequency).

For the shearing speed $\dot{\gamma} = d\gamma/dt$, the following is obtained from relation (3):

$$\dot{\gamma} = i\omega\gamma \qquad (4)$$

or $$\dot{\gamma} = \omega|\gamma| \qquad (4a)$$

The threshold value $\dot{\gamma}_S$ of the shearing speed, the exceeding of which is a prerequisite for the occurrence of a rise in viscosity of the dilatant fluid 58, is a material-specific quantity that, in the case of dilatant fluids of the explained type, has values around 60 s$^{-1}$, i.e., the following applies:

$$\dot{\gamma} = 60 \text{ S}^{-1} \qquad (5)$$

The minimum value $\gamma_{min}$, the exceeding of which is the second prerequisite for the occurrence of the increase in viscosity of the dilatant fluid 58, has a value around 0.5, so that the following applies:

$$\gamma_{min} = A_{min}/d = 0.5 \qquad (6)$$

$A_{min}$ being the minimum amplitude of the vibrations which the shearing lamellae 43 and the shearing lamellae 47 carry out with respect to one another.

Relations (5) and (6) therefore show that, in the case of an engine mounting 10, where the distance d of the shearing lamellae 43 and 47 is 1 mm, the "hardening" of the mounting starts at about 10 Hz, if the vibration amplitudes are 1 mm, and at about 20 Hz if the vibration amplitudes correspond to only the required minimum value of 0.5 mm. If necessary, the start of the viscosity rise of the dilatant fluid 58, within the scope defined by relation (5) and (6), by means of a reduction of distance d of the shearing lamellae 43 and 47, can be shifted in the direction of lower frequencies and/or amplitudes.

Also by means of the composition of the dilatant fluid 58, the material-specific value $\dot{\gamma}_S$ and thus the response behavior of the shearing unit 32 can be varied within wide ranges (between 1 s$^{-1}$ and 10$^4$ s$^{-1}$).

In the case of frequencies that are higher than the natural-vibration or resonance frequency of a mounting-mass system, the amplitudes of the excitable vibrations decrease approximately in a proportionality to 1/$\omega^4$, in the range of acoustic vibrations of a higher frequency, even if the shearing speed were still sufficient, the minimum shearing would no longer be reached, with the result that the vibration characteristics, in this acoustic range of higher frequencies, are determined essentially by the damping characteristics of the—elastic—damping body 18.

A typical quantity of the load that is to be absorbed statically, i.e., via its damping body 18, by an engine mounting 10, is around 1,000 N. By means of the excitation of vibrations, for example, by means of the road-caused excitation, additional 300 to 400 N of dynamic load are to be absorbed by each engine mounting 10 that would have to be absorbed by the stiffening of the mounting 10 if the desired vibration suppression is to be achievable.

In the case of the explained dimensioning of the engine mounting 10 explained by means of FIGS. 1 to 3, about 100 N of dynamic load can be absorbed for each pair of shearing lamellae 43 and 47, the overlapping area of which is about 10 cm$^2$, i.e., in the case of the engine mounting 10 according to FIG. 2, 1,600 N, which is very sufficient.

In the shearing unit 32 of an engine mounting 10, in which, as shown in FIG. 2, the shearing lamellae 34 and 47 extend in parallel to the Y-Z plane, under the conditions that were explained above for vibrations in Z-direction, the viscosity rise in the dilatant fluid 58 will naturally also occur when the engine 11 and the body 12 swing in Y-direction with respect to one another. A resulting achievable suppression of excessively increased vibration amplitudes should have little significance for reducing noise in a vehicle, because the excitation of vibrations of this type is less probable than the excitation of vibrations in Z-direction.

Also because of the vibrating movements of the engine 11 around its longitudinal axis that result in phase-opposed pressure and tension loads of both its engine mountings 10, a viscosity rise of the dilatant fluid 58 takes place in the shearing unit 32 of the mounting that—under the above-explained conditions—may by advantageous for reducing noise. Vibratory movements of this type can be excited periodically, for example, in the coasting operation of the engine, in which it is used as an "engine brake", but also in the full-load operation, for example, in the course of an ascent or during under-speeding.

However, vibrating movements of the engine 11 and of the body 12 with respect to one another in X-direction 67, when taken alone, in the case of an engine mounting 10 with the design and arrangement of the shearing lamellae 43 and 47 described by means of FIGS. 1 to 3, will not lead to a response of the shearing unit 32 in the sense of the drastic increase in viscosity of the dilatant fluid 58. This is so because, as a result of the limited swivelling capacity of the shearing lamellae 43 and 47, the minimum value $\gamma_{min}$ of the shearing is not reached. Thus, the shearing unit 32 remains "soft" in X-direction. However, naturally, the shearing unit 32 of an engine mounting 10 can also be oriented in such a way that the shearing lamellae 43 and 47 or their pivotal axes 63 and 64 extend in parallel to the X-Z plane. In the case of this orientation, the shearing unit 32 remains "soft" in Y-direction, whereas vibrating movements in Z and X-direction may result in a response of the shearing unit in the sense of the explained dynamic stiffening.

Within the framework of an engine mounting 10 as described by means of FIGS. 1 to 3, instead of the shearing unit 32, the shearing unit 32' shown in FIGS. 4 and 5, to the details of which reference is made below, may also be used. The construction and operation of this shearing unit 32' is largely analogous to that of shearing unit 32. Constructional differences between shearing units 32 and 32' are limited to the design of the shearing lamellae 43 and 47 or 43' and 47' and their fixing at the respective head plates 33 or 33' as well as base plates 36 or 36' of the respective shearing units 32 or 32'. For a comprehensive description of the shearing unit 32', it is therefore sufficient to explain its details that deviate from the shearing unit 32. In addition, for example, with respect to the conditions that are relevant for the design of shearing unit 32', reference is made to the explanations concerning the embodiment according to FIGS. 1 to 3.

The shearing lamellae 43' and 47' are developed as steel plate parts that have a thickness of 0.5 mm, the orientation of which in parallel to the Z—Y plane of the engine mounting 10- in the condition in which it is installed in the vehicle, will be the same as in the case of shearing unit 32.

Figure 5:
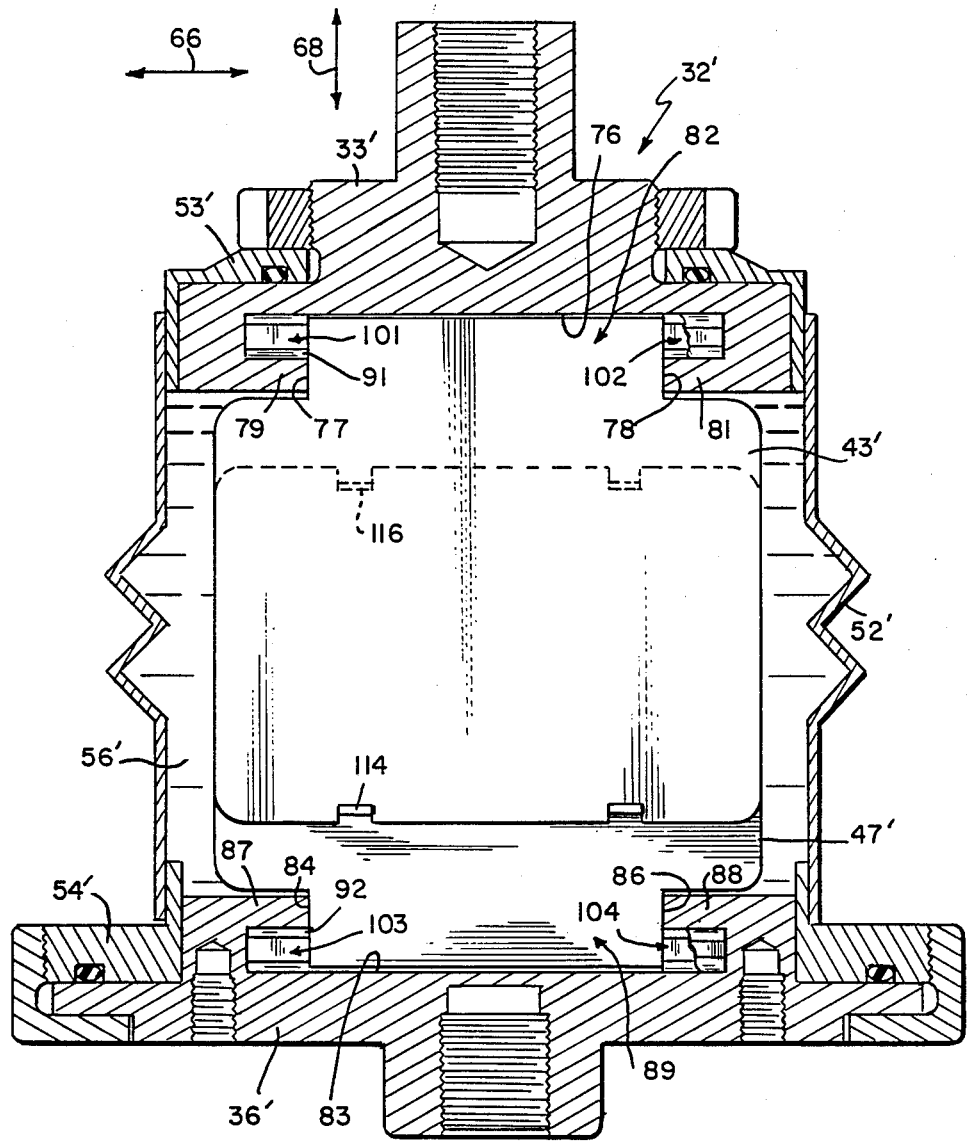
FIG. 5 is a sectional view of the shearing unit according to FIG. 4 taken along the center plane that is at a right angle with respect to the sectional plane of FIG. 4.

As best shown in FIG. 5, the head plate 33' has a T-groove 76 that is open in downward direction, the slot edges 77 and 78 of which are marked by the free longitudinal front faces of flange-shaped lower shoulders 79 and 71 of the head plate 33' that point toward one another.

The shearing lamellae 43' have anchoring parts 82 that match the cross-sectional shape of the T-groove 76 of the head plate 33' and by means of which the shearing lamellae 43' are supported at the headplate 33' in Z-direction 68 as well as in Y-direction 66.

The base plate 36' is also provided with a T-groove 83 that is open in upward direction and the slot edges 84 and 86 of which, in turn, are marked by the free longitudinal front faces of shoulders 87 and 88 of the base plate 36' that point toward one another. Anchoring parts, that correspond to the anchoring pieces 82 of the shearing lamellae 43' held at the head plate 33', by means of which the shearing lamellae 47' are held at the base plate 36', have the reference number 89.

The T-grooves 76 and 83 of the head plate 38' and of the base plate 36', at their open front faces, are closed off by the fastening frame flanges 53' and 54', by means of which the bellows 52' that delimits the receiving arm 56' for the dilatant fluid is connected to the head plate 38' and the base plate 36' in a fluid-tight way.

Within the T-grooves 76 and 83 of the head plate 33' and of the base plate 36', the shearing lamellae 43' and 47' are held at a distance A from one another, by means of spacing pieces 91 and 92. As seen in longitudinal direction of the T-grooves 76 and 83, i.e., in X-direction 67, distance A corresponds to the double value 2d of the distance d, which is increased by the shearing lamella thickness d' to form a space in which the dilatant fluid 58 can be subjected to the shearing between two respective shearing lamellae 43' and 47 within the rectangular parallelepiped-shaped space 50'.

The spacing pieces 91 and 92 are each connected firmly with the anchoring parts 82 and 89 of the shearing lamellae 43' hung in at the head plate 38' and of the shearing lamellae 47' hung in at the base plate 36', and have circular-arc-shaped upper and lower roll-off surfaces 93 and 94 or 96 and 97 as well as contact surfaces 98 and 99 that extend in parallel to the respective adjacent shearing lamella 43' or 47'.

The diameters of the spacing pieces 91 and 92 that are measured in parallel to the shearing lamella surfaces, apart from a small play, correspond to the vertical inside width of the lateral slot-shaped areas 101 and 102 of the T-groove 76 of the head plate 33' and of the T-groove 83 of the base plate 36' that are open toward the inside and in the downward and upward direction are delimited by the shoulders 79, 81 and 87, 88 of the head plate 33 and of the base plate 36'. In the case of the shown embodiment, the spacing pieces 91 and 92 in each case extend only over the horizontal length of the outer edge sections of the anchoring parts 82 and 89 of the shearing lamellae 43' and 47 that are received by the slots 101, 102 and 103, 104.

The shearing lamellae 43' of the bundle of lamellae anchored at the head plate 33' project vertically downward. They are held in an upright position by means of rubber-elastic, strip-shaped support bodies 105 and 106 that are arranged, prestressed by pressure, between downward-projecting shell parts 107 and 108 of the head-plate-side fastening frame flange 53' of the rubber bellows 52' that close the T-groove 76 of the head plate 33' on the front face and the anchoring parts 82 of the two extreme shearing lamellae 43' of the bundle of lamellae anchored at the head plate 33'. They are thus pushed into the shown initial position in which the shearing lamellae 43' are positioned by the course of the contact surfaces 98 of the spacing pieces 91. In the same way, the shearing lamellae 47' of the bundle of shearing lamellae held at the base plate 36', by means of rubber-elastic supporting bodies 109 and 111 that are prestressed under pressure and are arranged between upward-projecting shell parts 112 and 113 of the base-plate-side frame flange 54' of the bellows 52' that close the T-groove 83 of the base plate on the front side, and the anchoring pieces 89 of the respective extreme shearing lamellae 47' of the bundle of shearing lamellae held at the base plate 36', are pushed into the vertically upward-projecting initial position that is shown in FIG. 4. Spacers 114 and 116, by means of which the shearing lamellae 43' and 47' are held in the shearing area 50 at the predetermined distance d from one another, are developed as short tabs that are bent away from the lower transverse edges 44' of the shearing lamellae 43' and from the upper transverse edges 48' of the shearing lamellae 47', these short tabs supporting themselves in a sliding way at the respective adjacent shearing lamella 47' and 43'.

If, in the case of shearing element 32', horizontal movements occur between the engine 11 and the body 12 in X-direction 67, the shearing lamellae 43' and 47'—because of the elastic flexibility of the rubber-elastic supporting bodies 105, 106 as well as 109, 111 and the arched shape of the roll-off surfaces 93, 94 and 96, 97 of the spacing pieces 91 and 92, can carry out sufficiently wide swivelling movements which, in the case of the shown embodiment, are limited to about 20° which is very sufficient.

Figure 4:
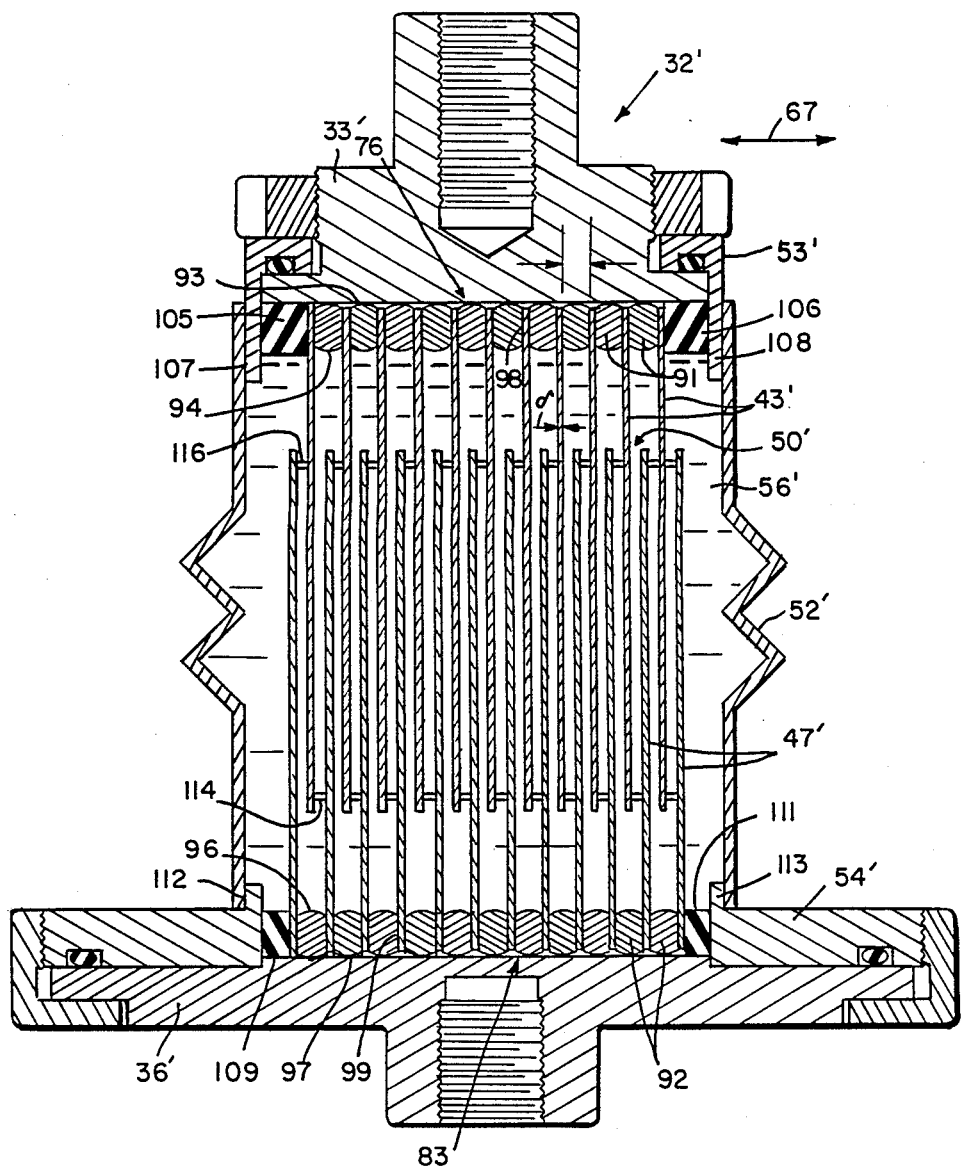
FIG. 4 is a sectional view similar to FIG. 2, showing another preferred embodiment of a shearing unit usuable within the framework of the engine mount according to FIG. 1.

In the shearing unit 32' according to FIGS. 4 and 5, with outer dimensions that are comparable with the shearing unit 32 according to FIGS. 1 to 3, a larger number of shearing lamellae 43' and 47' can be housed.

Figure 6:
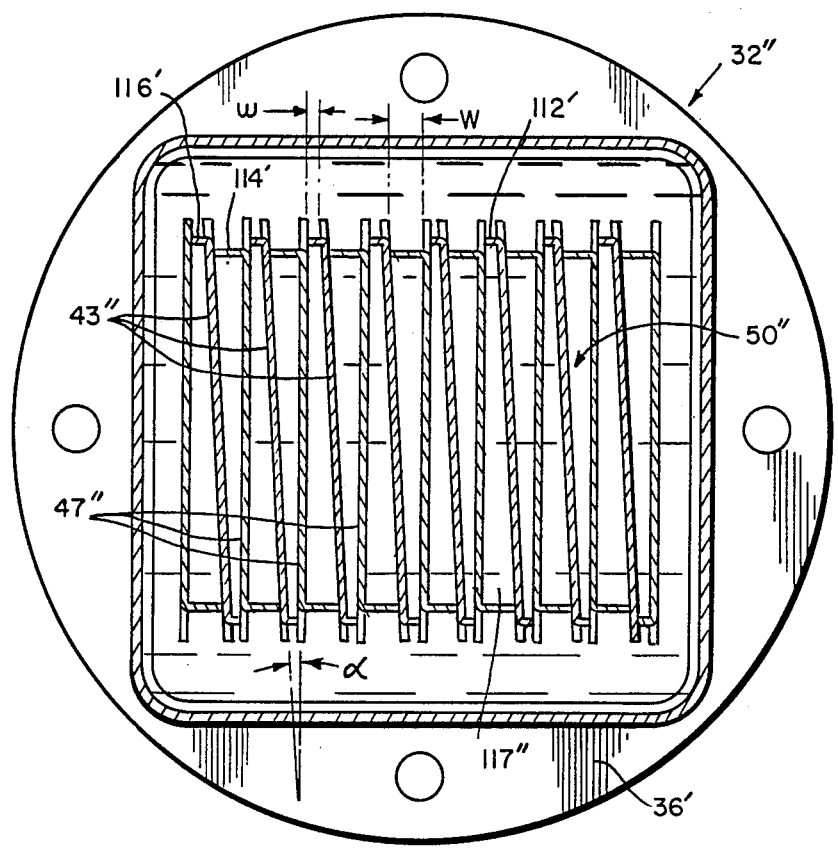
FIG. 6 is a view similar to FIG. 3, but showing a further preferred embodiment of a shearing unit.

The shearing unit 32" that is shown in FIG. 6 and that can be used also within the framework of a shearing element 10 according to the invention and that has the construction that corresponds to the shearing unit 32' according to FIGS. 4 and 5, differs from this shearing unit as follows. Unit 32" differs essentially by the fact that the shearing lamellae 43" anchored at the head plate and the shearing lamellae 47" anchored at the base plate 36', seen in the sectional plane that is in parallel to the base plate 36', enclose an acute angle with one another so that, between two adjacent shearing lamellae 43" that are anchored at the head plate and the shearing lamellae 47" arranged in-between and anchored at the base plate 36', two matchingly developed wedge-shaped shearing gaps 117' and 117" are formed, the total of which result in the rectangular-parallelepiped-shaped space 50", within which the dilatant fluid 58 can be subjected to the explained shearing. The angle is dimensioned in such a way that the largest width W of these gaps amounts to between 1.5 and 2 mm and the smallest width w of these gaps amounts to between 0.5 and 1 mm. By means of this arrangement of the shearing lamellae 43" and 47" with respect to one another, in the areas of larger widths of gaps 117' and 117", correspondingly smaller values of the shearings and of the shearing speeds are obtained than in the areas with smaller gap widths, resulting in a spreading of the frequency range, within which the shearing unit 32' "responds" with an increase of its viscosity.

In order to keep the shearing lamellae 43" and 47" in the shown position with respect to one another, the shearing lamellae 43" and 47", at their vertical longitudinal edges, have bent-off stop tabs 116' and 114' which, in each case, in a sliding way, support themselves at the outer edge of the adjacent shearing lamella 43" or 47". The shearing lamellae 43" that, in a way shown in FIG. 4, can be anchored pivotably at the head plate 33', are preferably developed in such a way that their large-surface plate-shaped areas that delimit the shearing gaps 117' and 117", with respect to their anchoring parts, by means of which the course of their pivotal axes is marked, are crossed by the angle $\alpha$ in such a way that the pivotal axes of the shearing lamellae 43' extend in parallel to the pivotal axes of the shearing lamellae 47".

The mentioned "spreading" of the response frequency range can also be achieved by the fact that, by means of the shearing lamellae 43" and 47", for example, seen in the sectional plane of FIG. 4, "horizontal" wedge-shaped shearing gaps are delimited.

Figure 7:
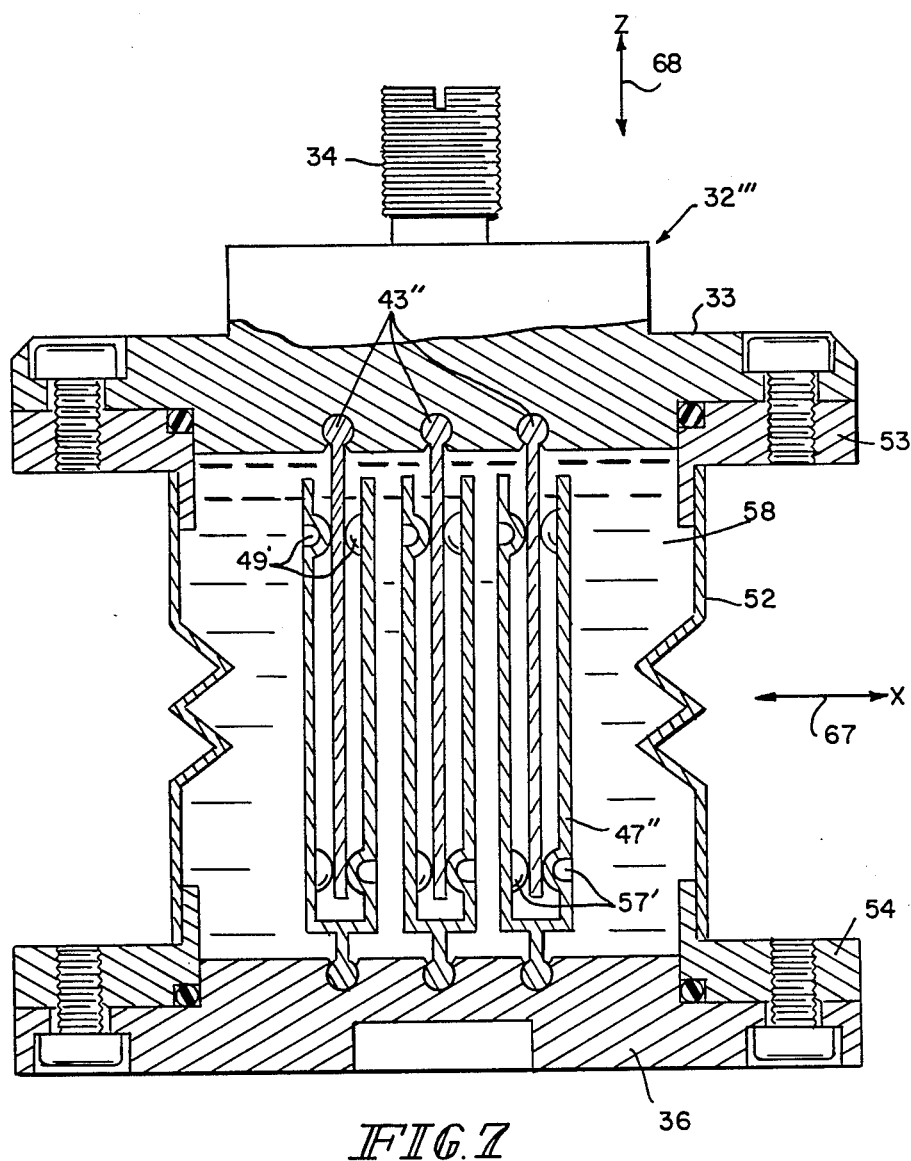
FIG. 7 is a view similar to FIG. 2, showing another preferred embodiment of a shearing unit that can be used in the engine mount of FIG. 1.

By means of the FIG. 7 embodiment, to the details of which reference is made at this point, another development will finally be explained of a shearing unit 32''' that can be used within the framework of a shearing element 10 according to the invention and that otherwise has a construction that corresponds to shearing unit 32 according to FIGS. 2 and 3.

As far as for elements of FIG. 7 the same reference symbols are used as for elements of FIGS. 1 to 3 this will imply a reference to the pertaining parts of the description in order to avoid repetitions.

The shearing unit 32''' according to FIG. 7 differs from the shearing unit 32 according to FIGS. 2 and 3 essentially by means of the fact that in each case two base-plate-side shearing lamellae are combined into a single U-shaped double shearing lamella 47" into which in each case one opposite, head-plate-side, flat-plateshaped shearing lamella 43" immerses that is guided by the spacers 49' and 51'. In the case of transverse movements of the head plate 33 with respect to the base plate 36 that take place in the direction of Arrow 67, an exactly defined gap width is maintained. As a result, an arrangement for the support of the outer, base-plate-side shearing lamellae, for example, by means of rubber bellows folds 74, as shown in FIG. 2, is also not necessary.

Shearing elements or units, as explained with respect to FIGS. 1 to 7, when used in engine mountings of vehicles, may advantageously be arranged in such a way that the planes of their shearing lamellae extend "diagonally", i.e., at an angle of 45° with respect to the longitudinal direction of the vehicle, the X-coordinate direction 67, and thus also with respect to the transverse direction of the vehicle, the Y-coordinate direction 66, and in parallel to the upward axis of the vehicle that is vertical to it, i.e., in parallel to the Z-coordinate direction 68. In the case of this arrangement, these types of shearing elements will then develop their vibration-insulating effect in all three coordinate directions. However, within the framework of an engine mounting, two shearing elements may also be used, in which case, one shearing element is arranged in such a way that its shearing lamellae extend in parallel to the Y-coordinate direction 66, while the other shearing element is arranged in such a way that its shearing lamellae extend in parallel to the longitudinal direction of the vehicle, the X-coordinate direction 67. A shearing element arrangement that is combined in this way also has an advantageous vibration-insulating effect in all coordinate directions 66, 67 and 68.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A support mount for the dynamic support of forces between two mass bodies of an assembly that can carry out vibration-type relative movements with respect to one another, particularly mountings for a vibration-insulating support and suspension of the driving engine of a motor vehicle at the body of the vehicle, having a damping body consisting of an elastomer and supporting the mass bodies with the vibrating capacity with respect to one another, said damping body, by means of its flexibility, at least in a limited frequency range of the occurring vibrations, providing a damping of said vibrations, and having a device that is provided for reducing an excessive resonance rise of the vibration amplitudes occurring in the natural-vibration range of the damping body-mass system and that comprises a receiving space that contains a very dilatant fluid into which immersion bodies project that go along in the relative movements of the vibrating masses, whereby the dilatant fluid is subjected to a shearing $\gamma$ and in the process, when a minimum value $\gamma_{min}$ of the shearing as well as a threshold value $\dot{\gamma}_S$ of the shearing speed are exceeded, develops a significantly higher viscosity, the geometric design and arrangement of the immersion bodies in the receiving space being carried out in such a way that in the range of the natural-vibration frequency of the damping body-mass system, the critical values $\gamma_{min}$ and $\dot{\gamma}_S$ of the shearing $\gamma$ and of the shearing speed $\dot{\gamma}$ are reached or exceeded, whereas in the range of acoustic vibrations of higher frequencies and having lower amplitudes, the minimum shearing $\gamma_{min}$ that is required for the viscosity increase of the dilatant fluid can no longer be reached, characterized in that, as immersion bodies, flat-plate-shaped shearing lamellae are provided that extend in parallel or approximately in parallel to one another and go along in the movements of one of the masses that are coupled with one another via the damping body, as well as also flat-plate-shaped shearing lamellae that extend in parallel or approximately in parallel to them that go along in the movement of the other mass, in which case, apart from a total of two edge-located lamellae, each of the shearing lamellae moving along with the one mass project between two shearing lamellae moving along with the other mass, in such a way that within the receiving space filled with the dilatant fluid, large-surface areas of the lamellae that can be moved with respect to one another are arranged adjacent to one another, and in that the shearing lamellae that go along in the movements of the one mass, for example, of the engine of a vehicle, and the shearing lamellae that go along in the movements of the other mass, for example, of the body of a vehicle, are disposed articulatingly and thus the two masses can be swivelled with respect to one another around several axes in such a way that a path and speed-dependent switching of the force transmission is achieved that moves around several axes and in the process remains constant.

2. A support mount according to claim 1, wherein one shearing unit is provided, the receiving space for the dilatant fluid of which, in radial direction with respect to a central longitudinal axis, is delimited in a fluid-tight way by a bellows that is flexible in axial and in radial direction, and in axial direction is delimited in a fluid-tight way by a head plate and a base plate at which the shearing lamellae are held, and being able to be filled completely by the dilatant fluid, and wherein the shearing unit, with its head plate can be fixed at one end with its base plate and can be fixed at the other one of the two masses that can vibrate with respect to one another.

3. A support mount according to claim 2, characterized in that, in a coaxial arrangement with respect to the central longitudinal axis of an engine mounting, the shearing unit is arranged within a cup-shaped mounting part that, with its bottom, can be fastened at one mass that can carry out vibrations—the body of a vehicle—, in that the damping body, on one side, supports itself with its outer edge at a free annular front face of the shell of the cup-shaped bearing part and is connected with it, and on the other side, with its central area, is connected firmly with the other mass that can carry out vibrations—the engine of the motor vehicle—, and in that the shearing unit, with its base plate, can be fixed at the bottom of the cup-shaped mounting part and with its head plate, can be fixed at a rigid mounting piece that penetrates centrally through the damping body and is firmly connected with it and with the engine.

4. A support mount according to claim 3, characterized in that the shearing lamellae that go along in the vibrating movement of one mass and/or the shearing lamellae that go along in the vibrating movements of the other mass, at their head-plate-side transverse edges and at their foot-place-side transverse edges, are provided with round-rod-shaped edge profile pieces, the diameter of which is larger than the thickness of the shearing lamellae, and in that the head plate and/or the base plate is provided with grooves that in a slot-shape, are open in the direction of the receiving space and are intended for receiving the edge profile pieces of the shearing lamellae, said grooves having a cross-sectional shape that matches the edge profile pieces of the shearing lamellae, in which case the slot widths of the grooves are slightly larger than the thickness of the shearing lamellae, but slightly smaller than the largest diameter of the edge profile pieces and preferably correspond to their mean value, and in that the front-side openings of the grooves, in each case, can be closed by means of a frame flange that is provided for the fastening of the bellows at the head plate and the base plate, and as a result, the shearing lamellae, seen in longitudinal direction of the grooves, are held at the head plate or at the base plate of the shearing unit so that they cannot be moved but can be swivelled around their longitudinal axes.

5. A support mount according to claim 4, characterized in that the shearing lamellae are developed as one-piece stamped parts preferably consisting of aluminum, the plate thickness of which is 1 mm, and the round-rod-shaped edge profile pieces of which have a diameter of 2 mm.

6. A support mount according to claim 3, characterized in that the head plate and the base plate of the shearing unit, at their interior sides that face one another, have T-grooves, within which the shearing lamellae are held by means of T-shaped anchoring pieces, at which, on one side, spacing pieces are fastened, that with a flat sliding surface, rest against the anchoring piece of the respective adjacent shearing lamella and have arched roll-off surfaces, by means of which the shearing lamellae support themselves at opposing groove-bottom surfaces and shoulders of the head plate and of the base plate, and in that the shearing lamellae, with their spacing pieces, and the shearing lamellae with its spacing pieces, within the T-groove and the T-groove, is supported by means of elastically pre-stressed strip-shaped supporting bodies that are arranged between individual parts of the fastening frame flange of the bellows that close off the front openings of the grooves and the respective extreme shearing lamellae that are anchored at the head plate and the base plate.

7. A support mount according to claim 6, characterized in that the shearing lamellae are manufactured as stampings made of 0.5 mm thick steel plate.

8. A support mount according to claim 3, characterized in that the shearing lamellae are developed as rectangular plates, the head-plate-side free transverse edges of which and the base-plate-side transverse edges of which, seen in a statically balanced condition of the shearing element, in each case, extend at a minimum distance of 5 mm from the interior surfaces of the head plate and of the base plate and in that the longitudinal edges of the shearing lamellae that extend in parallel to the central longitudinal axis of the shearing unit extend in planes that are parallel to one-another.

9. A support mount according to claim 8, characterized in that the axial expansion of the area within which the shearing lamellae are arranged opposite one another, and the dilatant fluid, in the case of relative movements of the masses, is subjected to a shearing, amounts to ⅔ and 4/3 of the width of the shearing lamellae that, in turn, has a value of between 20 mm and 40 mm.

10. A support mount according to claim 1, characterized in that the shearing lamellae are arranged equidistantly.

11. A support mount according to claim 10, characterized in that the distances d of each respective two adjacent shearing lamellae amount to between 0.5 mm and 2 mm, preferably around 1.0 mm.

12. A support mount according to claim 10, characterized in that the shearing lamellae are equipped with spacers, the height of which that determines the minimum distance of two adjacent shearing lamellae is by 5% to 15% less than their distance d that determines the holding of the shearing lamellae.

13. A support mount according to claim 12, characterized in that the spacers are developed as dome-shaped arched-out areas or as short tabs that are bent away from the free transverse edges of the shearing lamellae at a right angle.

14. A support mount according to claim 11, characterized in that the shearing unit is arranged within an engine mounting of a vehicle in such a way that the swivel axes of the shearing lamellae extend at a right angle to the longitudinal direction 67 of the vehicle.

15. A support mount according to claim 1, characterized in that the shearing lamellae that go along in the movements of one mass of the masses that are coupled with one another via the damping body extend in parallel to one another, in that the shearing lamellae that go along in the movements of the other mass, also extend in parallel to one another, but that the planes to which the lamellae that move along with one or the other mass extend in parallel, enclose an acute angle with one another, in which case matching wedge-shaped gaps are delimited by two respective lamellae moving along with one mass and the lamellae that is arranged between them and moves with the other mass, the gap widths of said gaps that is measured between the free edges of the mutually adjacent lamellae varying at a ratio of 2/1 to 3/1, the minimum gap width amounting to between 0.3 and 1 mm and preferably to around 0.5 mm.

16. A shearing element according to claim 2, characterized in that two respective base-plate-side shearing lamellae are combined in a U-shape as a double shearing lamella, into which head-plate-side shearing lamellae immerse that are held at a distance by the spacers.

17. Vehicle engine mounting unit for supporting a vehicle engine at a vehicle body, comprising:
an engine support part attachable to an engine to be movable therewith,
a vehicle body support part attachable to a vehicle body part to be movable therewith,
elastic body means interposed between the engine support part and body support part to dampen forces during relative movement thereof,
and shear unit means interposed between the engine support part and vehicle body part in parallel relationship to the elastic body means,
wherein the shear unit means includes a plurality of plate shaped lamellae having one end thereof connected to one of the engine support part and the body support part and the other end thereof extending between respective ones of the lamellae connected to the other part, said lamellae being disposed in a chamber of viscous fluid such that the lamellae and viscous fluid act to limit relative movement of the engine support part and body support part as a function of the speed and frequency of said relative movement.

18. Vehicle engine mounting unit according to claim 17, wherein the lamellae are pivotally connected at the engine support part and the body support part.

* * * * *

UNITED STATES PATENT AND TRADEMARK OFFICE
CERTIFICATE OF CORRECTION

PATENT NO. : 4,852,533

DATED : August 1, 1989

INVENTOR(S) : F. Doncker, et al.

It is certified that error appears in the above-identified patent and that said Letters Patent is hereby corrected as shown below:

Title page, item [73] should read as follows:

-- Assignee: Daimler-Benz Aktiengesellschaft, Stuttgart, Fed. Rep. of Germany; Gerhard Welzel, Seeshaupt, Fed. Rep. of Germany; Richard Bung, Ludwigshafen, Fed. Rep. of Germany --

Signed and Sealed this

Tenth Day of July, 1990

Attest:

HARRY F. MANBECK, JR.

*Attesting Officer*  *Commissioner of Patents and Trademarks*